(12) United States Patent
Nagano et al.

(10) Patent No.: US 8,854,737 B2
(45) Date of Patent: Oct. 7, 2014

(54) COLLIMATOR DEVICE AND LASER LIGHT SOURCE

(75) Inventors: Shigehiro Nagano, Yokohama (JP);
Motoki Kakui, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 13/601,329

(22) Filed: Aug. 31, 2012

(65) Prior Publication Data

US 2013/0050838 A1 Feb. 28, 2013

Related U.S. Application Data

(60) Provisional application No. 61/616,109, filed on Mar. 27, 2012.

(30) Foreign Application Priority Data

Aug. 31, 2011 (JP) .................... 2011-189126

(51) Int. Cl.
*G02B 27/30* (2006.01)
*B23K 26/06* (2014.01)

(52) U.S. Cl.
CPC .......... *G02B 27/30* (2013.01); *B23K 26/0648* (2013.01); *B23K 26/0656* (2013.01); *B23K 26/0665* (2013.01)
USPC ...................... 359/641; 250/494.1

(58) Field of Classification Search
CPC ........... B23K 26/0665; B23K 26/0648; B23K 26/0656; G02B 27/30

USPC ................ 359/362, 641; 385/15, 31–33, 52; 250/491.1; 362/257, 259, 311.12
See application file for complete search history.

(56) References Cited

U.S. PATENT DOCUMENTS 6,075,650 A * 6/2000 Morris et al. ................ 359/641
6,768,593 B1 * 7/2004 Jutamulia .................... 359/641

FOREIGN PATENT DOCUMENTS

JP 2001-510582 A 7/2001
JP 2006-212689 A 8/2006

OTHER PUBLICATIONS

International Preliminary Report on Patentability and Written Opinion in PCT International Application No. PCT/JP2012/070513, dated Mar. 13, 2014.

* cited by examiner

*Primary Examiner* — Darryl J Collins
*Assistant Examiner* — Gary O'Neill
(74) *Attorney, Agent, or Firm* — Venable LLP; Michael A. Sartori; Tamatane J. Aga (57) ABSTRACT

The present invention relates to a laser light source and others for decreasing wavelength-by-wavelength differences of focal positions of focused components in collimating and then focusing polychromatic light with a wide spectrum width. The laser light source includes a collimator device, in which relative positions of emergence of a laser beam emitted from a polychromatic light source and a collimating lens composed of an achromatic lens can be adjusted at a 10 μm level or less.

7 Claims, 10 Drawing Sheets

SPACING A BETWEEN COLLIMATING LENS
AND CONDENSING LENS (mm)

COLLIMATOR DEVICE AND LASER LIGHT SOURCE

CROSS-REFERENCE TO RELATED APPLICATION

This application is based upon and claims the benefit of priorities from U.S. Provisional Application No. 61/616,109, filed on Mar. 27, 2012 and Japanese Patent Application No. 2011-189126, filed on Aug. 31, 2011, the entire contents of which are incorporated herein by reference.

BACKGROUND OF THE INVENTION

1. Field of the Invention

The present invention relates to a collimator device for collimating incoming light with a wide spectrum width and a laser light source for realizing irradiation with laser light obtained by collimating and then focusing incoming light with a wide spectrum width.

2. Related Background of the Invention

Processing with a laser beam is carried out using a configuration wherein a laser beam emitted to diverge from an end face of an optical fiber is collimated and thereafter the collimated laser beam is focused by a condensing lens to be concentrated at a point of a workpiece. When the laser beam is polychromatic light with a wide spectrum width such as white light, focal lengths differ depending upon wavelengths of the light. It causes positions (beam waists) where components of the light emitted from the end face of the optical fiber become plane waves relative to the end face of the optical fiber, to differ depending upon the wavelengths of the light as well, and it is thus difficult to focus the polychromatic light at a point. For this reason, the conventional laser processing technologies employ such devising that chromatic aberration is reduced by use of an achromatic lens as the condensing lens.

SUMMARY OF THE INVENTION

The inventors studied the conventional laser processing technologies and found the problem as described below. Namely, when the polychromatic light is light with the spectrum width of several hundred nm, it is expected even with the use of the achromatic lens that there are considerable differences among positions of focal spots due to differences of wavelength components. In microfabrication such as laser processing in the thickness direction of a thin substrate requiring accuracy of depth, chromatic aberration can affect processing accuracy.

The present invention has been accomplished in order to solve the problem as described above and it is an object of the present invention to provide a collimator device capable of achieving further reduction in the wavelength-dependent position differences of the beam waists where plane waves are formed (variations of beam waist positions depending upon the wavelengths in polychromatic light), in collimating the polychromatic light with a wide spectrum width, and a laser light source capable of reducing the focal length differences depending upon the wavelengths in the polychromatic light.

In order to achieve the above object, a collimator device according to a first aspect of the present invention comprises a laser entrance unit, a collimating lens, a collimating lens setup unit, and a position adjustment unit. The laser entrance unit sets a position of entrance of a laser beam. The collimating lens collimates the laser beam incoming from the laser entrance unit. The collimating lens is composed of an achromatic lens. The collimating lens setup unit sets up the collimating lens. The position adjustment unit enables position adjustment of a distance between the position of entrance of the laser beam and a center position of the collimating lens at a 10 μm level or less. The "center position of the collimating lens" refers to a position where a maximum effective diameter of the lens is defined, as shown in FIGS. 3A to 3C and 5A, and when "position of the collimating lens" is simply stated without any particular note in the description hereinafter, it shall mean the "center position of the collimating lens."

A laser light source according to a second aspect of the present invention is a laser light source to which the collimator device according to the above first aspect can be applied. The laser light source according to this second embodiment comprises an optical fiber, a collimating lens, a condensing lens, a laser entrance unit, and a collimating lens setup unit. The optical fiber emits a laser beam with a spectrum width of several hundred nm as a single-mode beam. The collimating lens collimates the laser beam emitted to diverge from the optical fiber. The collimating lens is composed of an achromatic lens. The condensing lens focuses the laser beam collimated by the collimating lens. The condensing lens is composed of an achromatic lens. The laser entrance unit sets a position of entrance of the laser beam emitted from the optical fiber. The collimating lens setup unit fixes the collimating lens.

Figure 7:
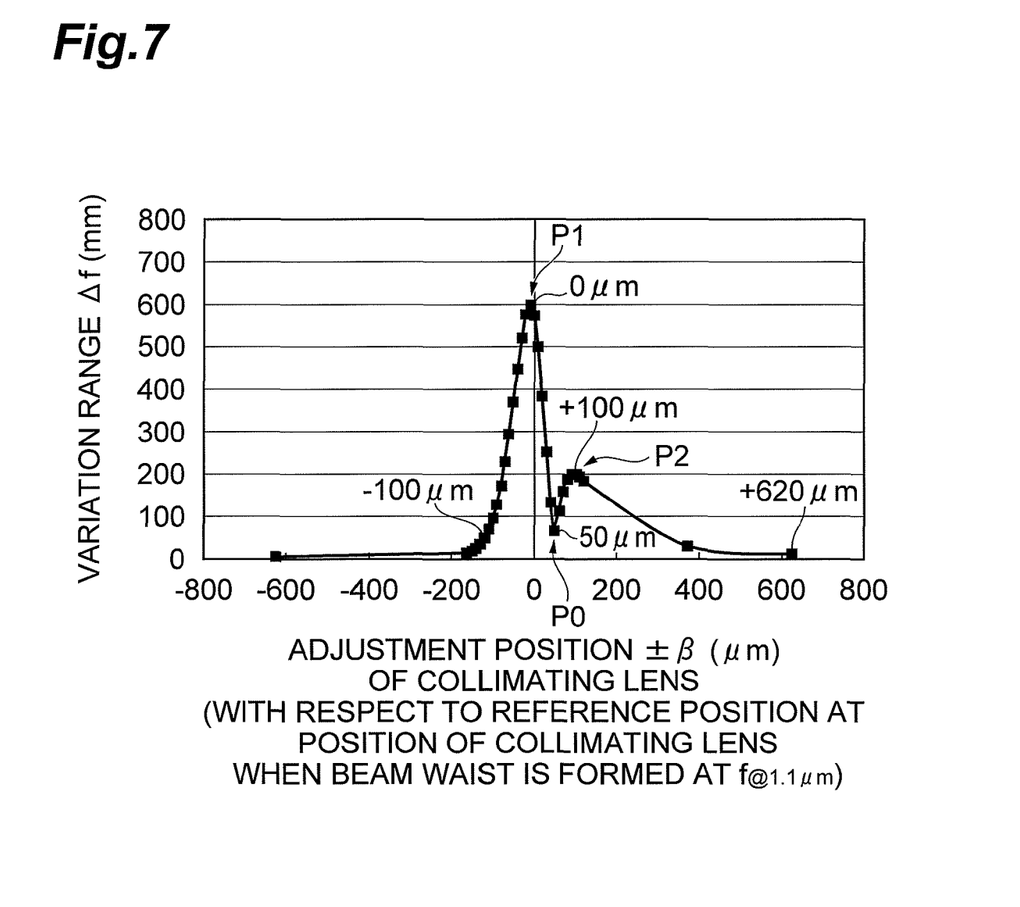
FIG. 7 is a drawing showing the result of determination of position differences of beam waists of polychromatic light (variation range of beam waist positions due to differences of wavelengths), versus adjustment position $\pm\beta$ of the collimating lens.

Particularly, in the laser light source of the second aspect, a distance between the position of entrance of the laser beam and a center position of the collimating lens is adjusted in a relation of the position of entrance of the laser beam and an adjustment position of the collimating lens, against a variation range of beam waist positions formed through the collimating lens (or a difference between a wavelength-dependent maximum variation and a wavelength-dependent minimum variation) (cf. FIG. 7). The adjustment position is defined by a deviation amount relative to a focal length of the collimating lens at a reference wavelength component in the laser beam, of the distance between the position of entrance of the laser beam and the center position of the collimating lens. The variation range is defined by a difference between a maximum and a minimum of variations relative to a beam waist position of the reference wavelength component formed through the collimating lens, of beam waist positions differing depending upon wavelength components of the laser beam. The distance between the position of entrance of the laser beam and the center position of the collimating lens is adjusted so that the adjustment position falls between a position where the variation range becomes minimum and a position where the variation range becomes sub-peak. When the distance between the position of entrance of the laser beam (light exit end face of the optical fiber) and the center position of the collimating lens is set in this manner, the wavelength-dependent variation of beam waist positions where plane waves are formed, is reduced even with the different wavelength components. Therefore, it becomes feasible to reduce the wavelength-by-wavelength differences of positions where plane waves are formed when the polychromatic light is collimated into parallel light and to also reduce the wavelength-by-wavelength differences of focal positions after focused by the condensing lens.

Figure 5A:
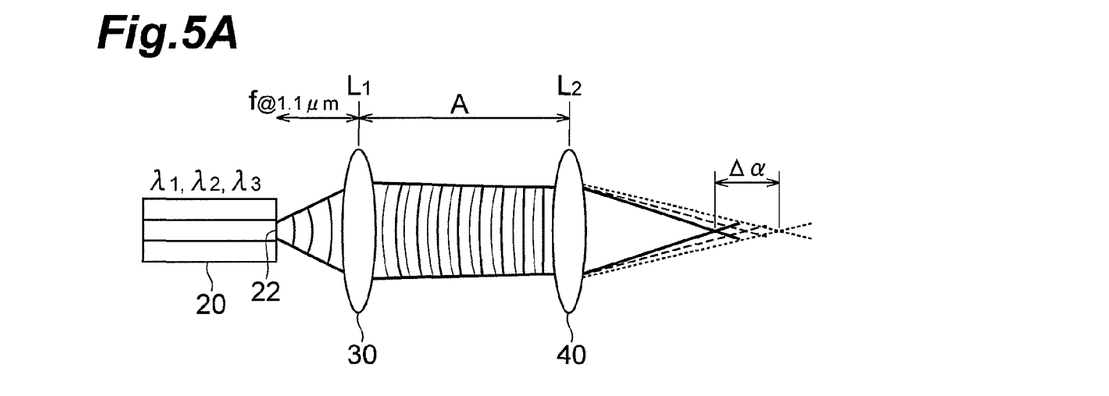
FIGS. 5A and 5B are drawings showing a relation of wavelength-dependent focal length difference $\Delta\alpha$ versus spacing A between the center position of the collimating lens and a center position of a condensing lens, in a state in which the distance between the end face of the optical fiber and the center position of the collimating lens is fixed at the focal length of the collimating lens at the wavelength of 1.1 μm.

As a third aspect applicable to the second aspect, the laser light source may comprise a condensing lens setup unit to fix the condensing lens. In this case, as to focal lengths of the condensing lens differing depending upon the wavelength components in the laser beam, a spacing between a center position of the condensing lens and the center position of the collimating lens is preferably so set that a maximum difference of the focal lengths becomes substantially minimum. The "center position of the condensing lens" refers to a position where a maximum effective diameter of the lens is defined, as shown in FIG. 5A, as in the case of the aforementioned "center position of the collimating lens," and when "position of the condensing lens" is simply stated without any particular note in the description hereinafter, it shall mean the "center position of the condensing lens."

As a fourth aspect applicable to at least either of the second and third aspects, the laser light source may comprise a position adjustment unit provided for either of the laser entrance unit and the collimating lens setup unit. This position adjustment unit enables position adjustment of the distance between the position of entrance of the laser beam and the center position of the collimating lens at a 10 μm level or less.

As a fifth aspect applicable to at least any one of the second to fourth aspects, the laser light source may comprise a pinhole provided at a laser output end of the optical fiber. As a sixth aspect applicable to the fifth aspect, an aperture diameter of the pinhole is preferably equal to or smaller than a mode field diameter of the optical fiber for the shortest wavelength component out of the wavelength components in the laser beam. Furthermore, as a seventh aspect applicable to at least either one of the fifth and sixth aspects, an opening end to define the pinhole may be processed in a taper shape.

DESCRIPTION OF THE PREFERRED EMBODIMENTS

In the following, each of embodiments of the present invention will be described below in detail with reference to the accompanying drawings. In the description of the drawings the same portions and the same elements will be denoted by the same reference signs, without redundant description.

First Embodiment

Figure 1A:
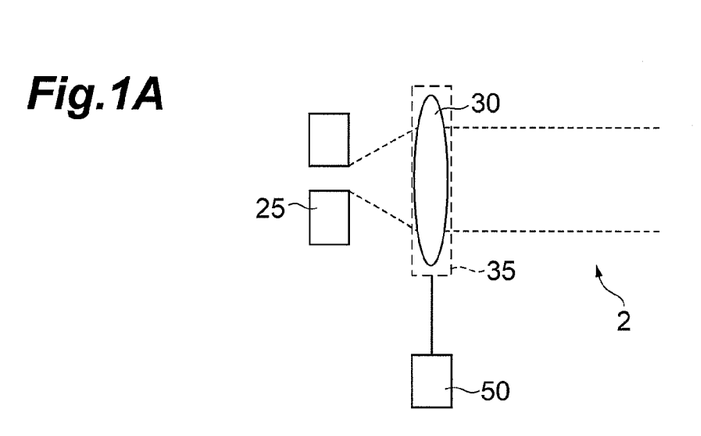
FIGS. 1A and 1B are respective schematic configuration diagrams of a collimator device and a laser light source according to the first embodiment.
Figure 1B:
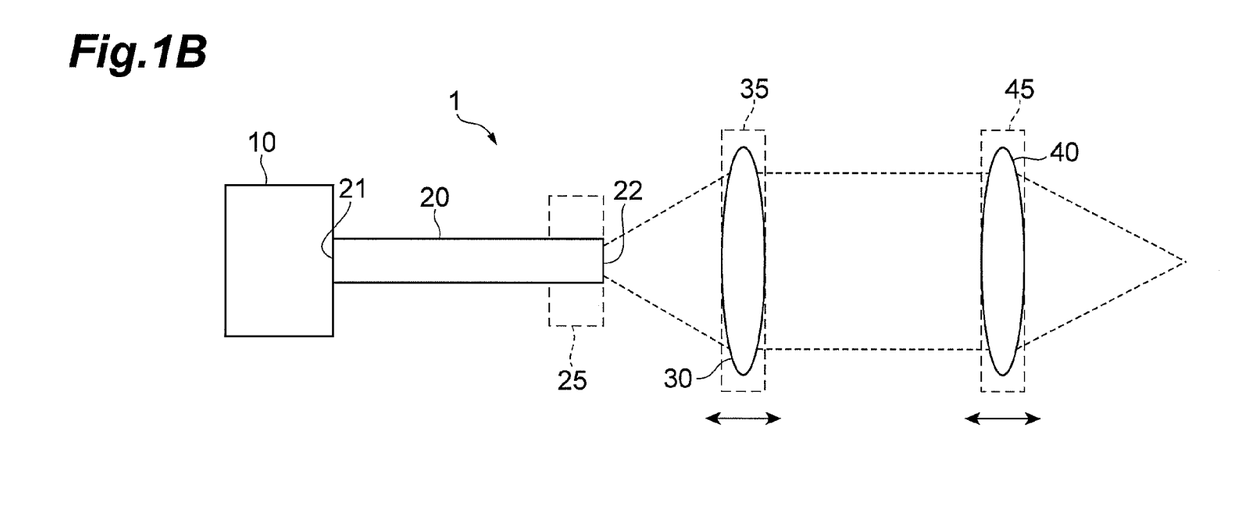

FIGS. 1A and 1B are schematic configuration diagrams of a collimator device 2 and a laser light source 1 according to the first embodiment. The collimator device 2 in FIG. 1A is composed of a laser entrance unit 25 to set a position of emission of a laser beam, a collimating lens 30, a collimating lens setup unit 35 to fix the collimating lens 30, and a position adjustment unit 50 to adjust a position of the laser entrance unit in order to adjust a spacing between a laser exit position (fiber exit end face) 22 of the laser entrance unit 25 and a position of the collimating lens 30. The position adjustment unit 50 may be arranged so as to be able to adjust a position of the collimating lens setup unit 35. The laser light source 1 in FIG. 1B is constructed including a light source 10, an optical fiber 20, the laser entrance unit 25 to fix the end face 22, the collimating lens 30, the collimating lens setup unit 35 to fix the collimating lens 30, a condensing lens 40, and a condensing lens setup unit 45 to fix the condensing lens 40. Among these, the laser entrance unit 25, collimating lens 30, and collimating lens setup unit 35 function as a collimator device. The light source 10 may include the optical fiber 20 for output. The exit end face 22 of the optical fiber 20 may be one having an end cap structure of coreless fiber to reduce the power density of light guided through the optical fiber 20, in order to avoid damage to the end face of the optical fiber 20 at the end.

The polychromatic light source 10 is, for example, a light source that emits polychromatic light with a spectrum width of 0.9 to 1.3 μm. The polychromatic light emitted from the polychromatic light source 10 is injected into a core region of the optical fiber 20 through one end face 21 of the optical fiber 20. The optical fiber 20 is composed of the core region as a central part and a cladding region covering the periphery of the core region, and the polychromatic light injected through the end face 21 into the core region propagates in the core region to be emitted from the other exit end face 22. The diameter of the core region in the optical fiber 20 is, for example, about 10 μm. When the laser beam with high output power is emitted from the narrow core region, the end face damage will occur at the exit end face 22 of the optical fiber 20. For this reason, the laser beam is emitted through an end cap fiber consisting of a coreless fiber or the like capable of reducing the power density, in order to avoid the end face damage. As an example, the end cap fiber is a coreless glass rod having the length of 500 μm and the diameter of 125 μm. In practice the laser light source 1 is designed based on the assumption of the exit diameter and exit angle with these components being set up, so as to accord therewith. In order to simplify the description, the below will describe a configuration without the end cap at the exit end face 22 of the optical fiber 20.

The polychromatic light emitted from the exit end face 22 of the optical fiber 20 is incident into the collimating lens 30 to be collimated thereby and then the collimated light is output therefrom. Then the collimated polychromatic light is incident into the condensing lens 40 and travels through the condensing lens 40 to be focused at points P (point $P_{min}$ (shortest focal position) to point $P_{max}$ (longest focal position)) different depending upon wavelengths.

The exit end face 22 of the optical fiber 20 is fixed by the laser entrance unit 25. The collimating lens 30 is fixed by the collimating lens setup unit 35. Relative positions of the collimating lens setup unit 35 and the laser entrance unit 25 can be adjusted in μm unit by the position adjustment unit 50. The condensing lens 40 is fixed by the condensing lens setup unit 45. Relative positions of the condensing lens setup unit 45 and the collimating lens setup unit 35 can be adjusted in 10 mm unit.

In general, when the light emitted from the polychromatic light source 10 is light of a single wavelength, i.e., monochromatic light, collimated light can be generated from the light emitted from the optical fiber 20 by setting the collimating lens 30 at the position of focal length f corresponding to the wavelength. Then a plane wave can be formed at a desired position by adjusting the position of the collimating lens 30. By setting the condensing lens 40 at the position where the plane wave is formed, a focal spot where the monochromatic light is best focused is formed at the position of the focal length from the condensing lens 40.

Figure 2A:
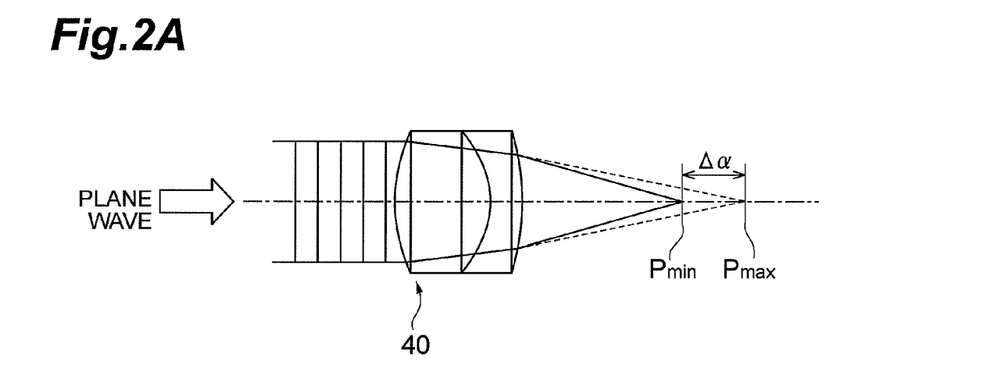
FIGS. 2A and 2B are drawings showing chromatic aberration occurring when a plane wave is injected into each of a planoconvex lens and an achromatic lens.
Figure 2B:
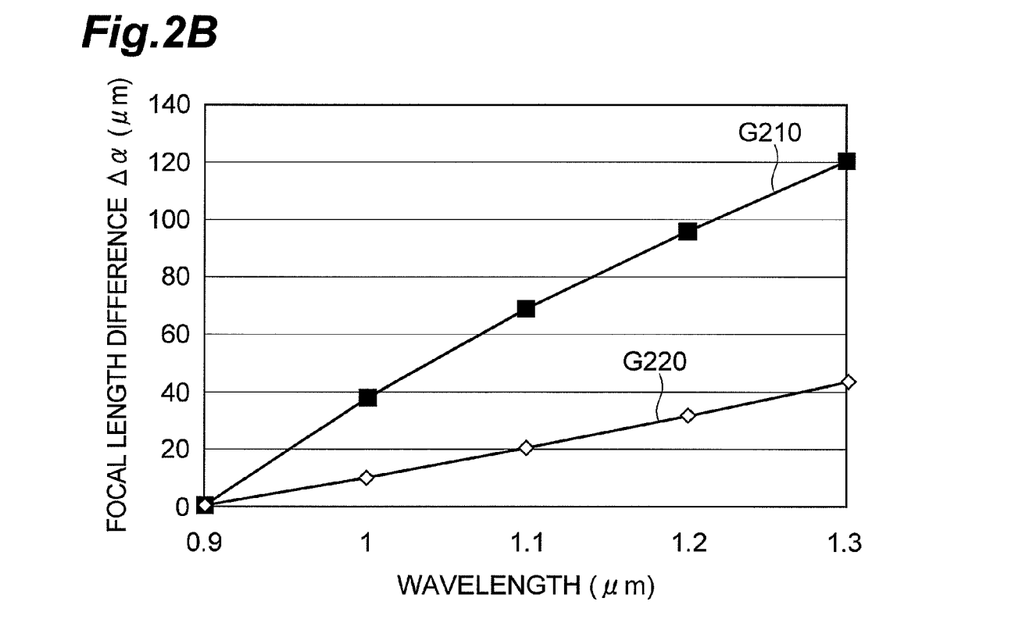

It was considered that when the light emitted from the polychromatic light source 10 was the polychromatic light with a wavelength band spreading across several hundred nm, even if plane waves were formed at the same position by the collimating lens 30, the condensing lens 40 could not focus the light at a point in the optical-axis direction, because of chromatic aberration of respective light components. FIGS. 2A and 2B show the result of calculation of chromatic aberration in cases where a plane wave is made incident into each of a planoconvex lens and an achromatic lens (model number: 45783-L, available from Edmund Optics). FIG. 2A shows focal length differences due to the chromatic aberration of polychromatic light with incidence of a plane wave and FIG. 2B shows the result thereof. In FIG. 2B, graph G210 shows the calculation result of the planoconvex lens and graph G220 the calculation result of the achromatic lens. The vertical axis of the graph in FIG. 2B represents the focal position differences of light components of respective wavelengths with respect to 0 set at the position of focus of 0.9 μm-wavelength-band light after passage through the condensing lens (planoconvex lens or achromatic lens). For example, the achromatic lens used in the calculation of FIG. 2B is supposed to be able to demonstrate the function as achromatic lens for polychromatic light of 0.7 μm to 1.1 μm. On the other hand, it was confirmed by the result of the calculation that the achromatic lens demonstrated the same lens characteristics (change of focal position) for light at the wavelengths of 1.2 μm and 1.3 μm as those for the polychromatic light of 0.7 μm to 1.1 μm. The difference between the focal position for light of the wavelength of 0.9 μm and the focal position for light of the wavelength of 1.3 μm was 43 μm in the case of the achromatic lens, and it was 120 μm in the case of the planoconvex lens.

Namely, it is confirmed that the focal position differences with variation in wavelengths of incident light can be made smaller with the use of the achromatic lens as the condensing lens than with the use of the planoconvex lens.

In the case where the polychromatic light emitted from the exit end face 22 of the optical fiber 20 was collimated by the collimating lens 30 and thereafter focused by the condensing lens 40 as in the laser light source 1 in FIG. 1B, the incident light into the condensing lens 40 was generally required to be a plane wave, as shown in FIG. 2A. However, when diverging light is incident into the collimating lens 30, light components incident into the collimating lens 30 fail to be plane waves at the same position, depending upon wavelengths, and their focal positions become complicated.

Figure 3A:
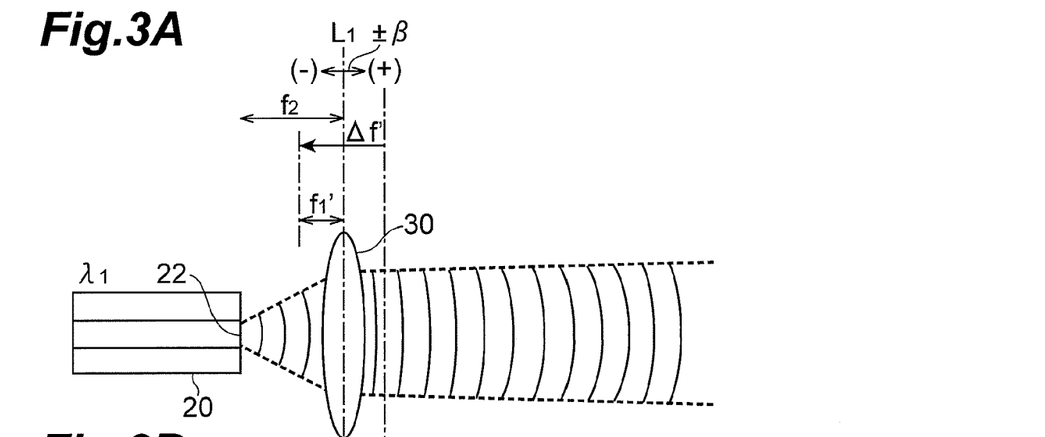
FIGS. 3A to 3C are drawings schematically showing how a position of a beam waist varies depending upon wavelengths of output light with respect to a distance $f_2'$ from a collimating lens to a beam waist (plane wave), in a state in which the distance between an end face of an optical fiber and a center position of the collimating lens is fixed at a focal length at a wavelength $\lambda_2$.
Figure 3B:
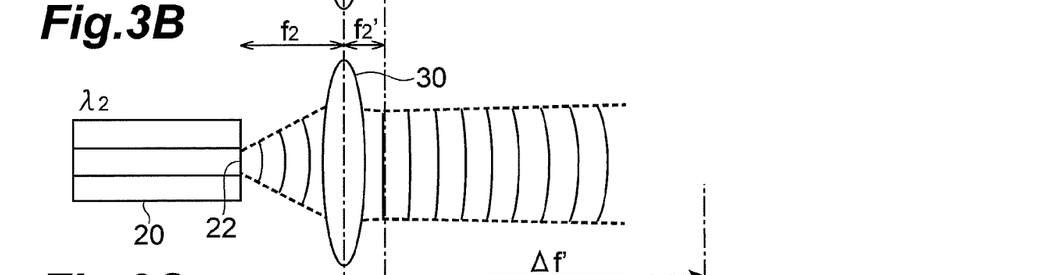
Figure 3C:
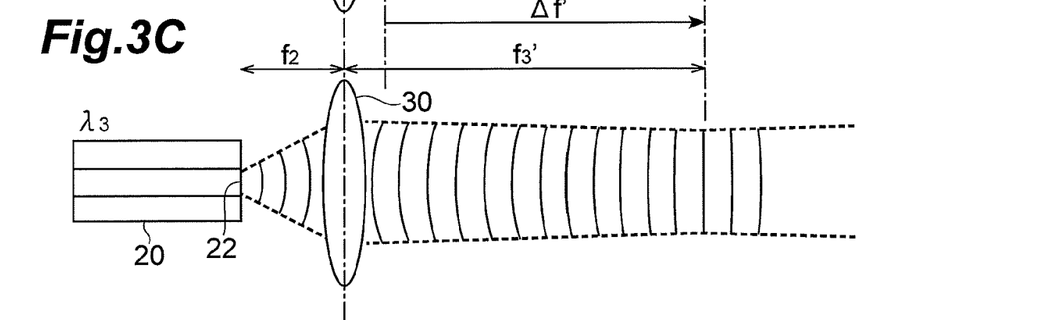

FIGS. 3A to 3C schematically show how distance $f_n'$ from the collimating lens 30 to a beam waist (position where a plane wave is formed) varies depending upon the wavelength λ of outgoing light in the case where the light from the polychromatic light source 10 is emitted to diverge from the exit end face 22 of the optical fiber 20 and collimated (into parallel light) by the collimating lens 30. At each wavelength, the position of the collimating lens 30 (center position) is set at a location $L_1$ defined so that when light of a wavelength $\lambda_2$ is emitted from the collimating lens 30 toward the optical fiber 20, the light of the wavelength $\lambda_2$ is focused at the exit end face 22 of the optical fiber 20 (FIG. 3B). The wavelengths $\lambda_1$, $\lambda_2$, and $\lambda_3$ are in the relation of $\lambda_3 < \lambda_2 < \lambda_1$ and at the wavelength $\lambda_1$ longer than the wavelength $\lambda_2$, the distance $f_1'$ from the collimating lens 30 to the beam waist becomes negative (on the exit end face 22 side of the optical fiber 20) (FIG. 3A). In the case of FIG. 3A, the beam waist is virtual because there is no beam waist in fact. At the wavelength $\lambda_3$ shorter than the wavelength $\lambda_2$, the distance $f_3'$ from the collimating lens 30 to the beam waist is positive (on the condensing lens 40 side) (FIG. 3C). In FIGS. 3A to 3C, Δf' is defined as a position variation with respect to $f_2'$, of the distance $f_n'$ to the beam waist at each of the wavelength $\lambda_1$ and the wavelength $\lambda_3$.

Figure 4:
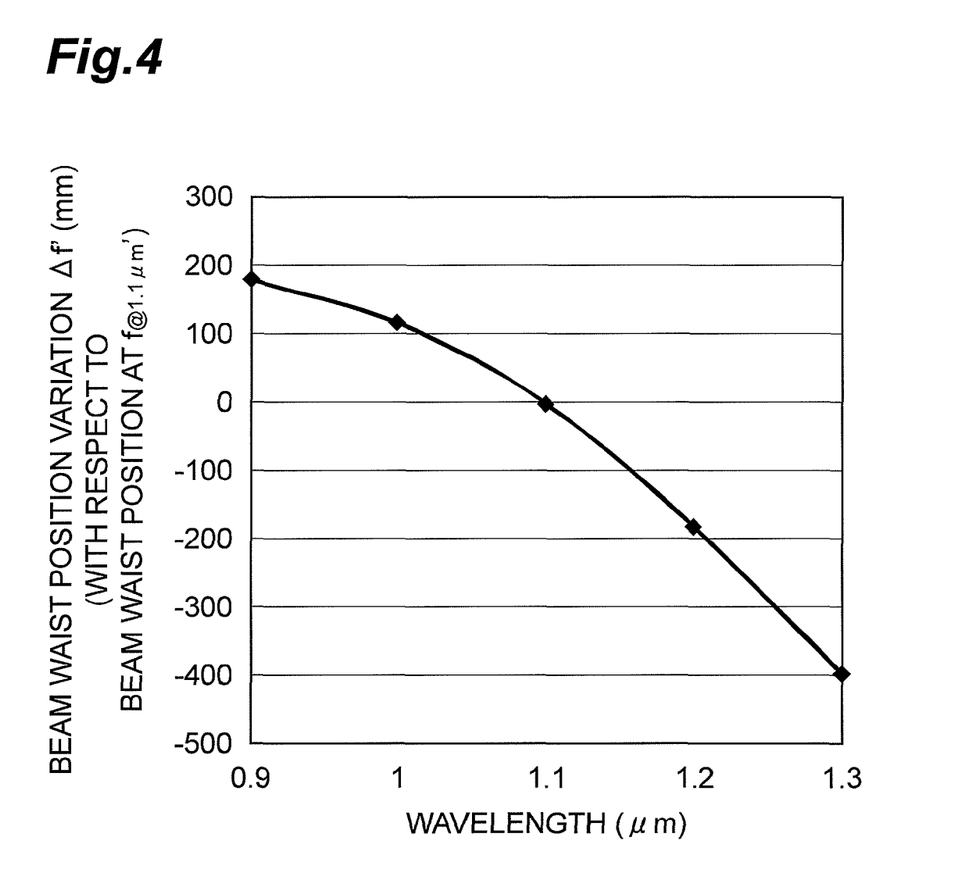
FIG. 4 is a drawing showing a relation of position variation $\Delta f'$ of a beam waist (position where a plane wave is formed) versus wavelengths of 0.9 μm to 1.3 μm, with respect to a reference position at a beam waist position at the wavelength of 1.1 μm, in a state in which the distance between the end face of the optical fiber and the center position of the collimating lens is fixed at the focal length of the collimating lens at the wavelength of 1.1 μm.

FIG. 4 shows the position variation Δf' of beam waist at the wavelengths of 0.9 to 1.3 μm where the reference wavelength $\lambda_2$ is 1.1 μm. Δf' varies between about +200 mm and about −400 mm. The median of focal spot positions at the wavelengths of 0.9 to 1.3 μm (the median of the variation range of focal length differences at the wavelengths of 0.9 to 1.3 μm) is near the wavelength of 1.1 μm in FIG. 2B, whereas FIG. 4 gives the impression that it is considerably far from the wavelength of 1.1 μm. The collimating lens 30 used was the same as the achromatic lens used and shown in FIGS. 2A and 2B.

Figure 5B:
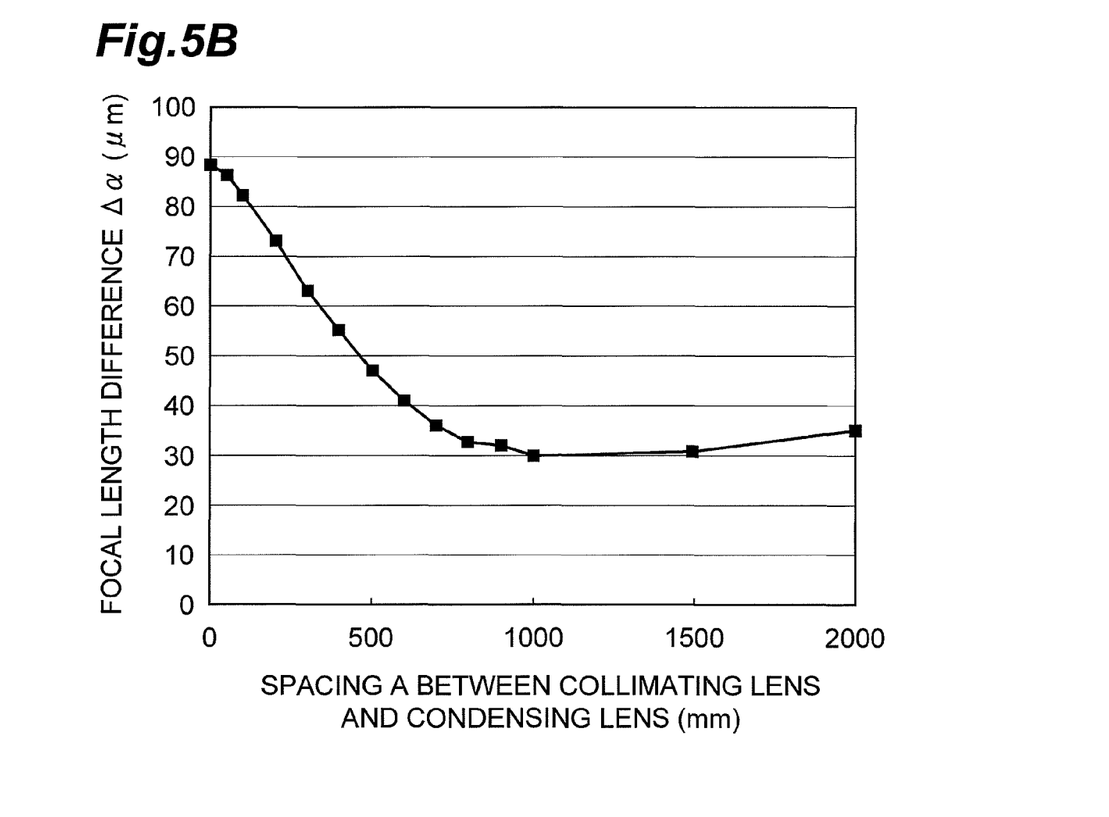

FIG. 5A is a drawing in which the condensing lens 40 in FIG. 2A (which is the same as the achromatic lens shown in FIGS. 2A and 2B) is arranged in the configuration of the collimator device in FIGS. 3A to 3C, where the reference wavelength $\lambda_2$ is 1.1 μm. FIG. 5B shows a relation of focal length difference Δα ($=P_{max}-P_{min}$) with light in the wavelength band (0.9 μm to 1.3 μm) versus spacing A between the collimating lens 30 and the condensing lens 40, under the foregoing condition. It can be confirmed herein that the wavelength-dependent focal length difference Δα decreases with increase in spacing A and that minimum Δα is about 30 μm near about 1000 mm. However, as the spacing A exceeds 1000 mm, Δα tends to increase on the contrary.

Figure 6A:
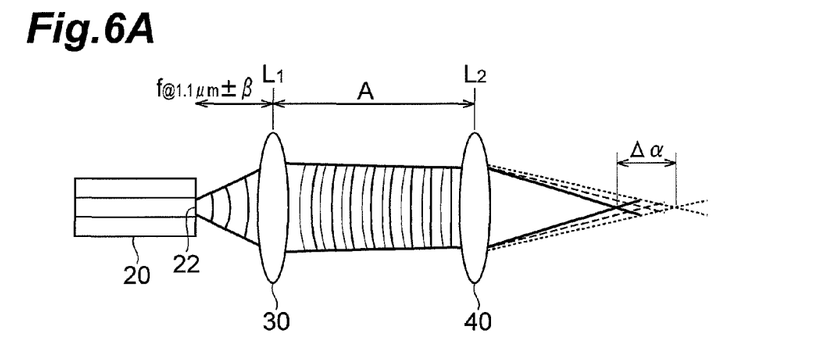
FIGS. 6A and 6B are drawings showing the result of calculation of beam waist positions for the wavelengths of 0.9 μm to 1.3 μm, with variation in adjustment position $\pm\beta$ of the collimating lens.
Figure 6B:
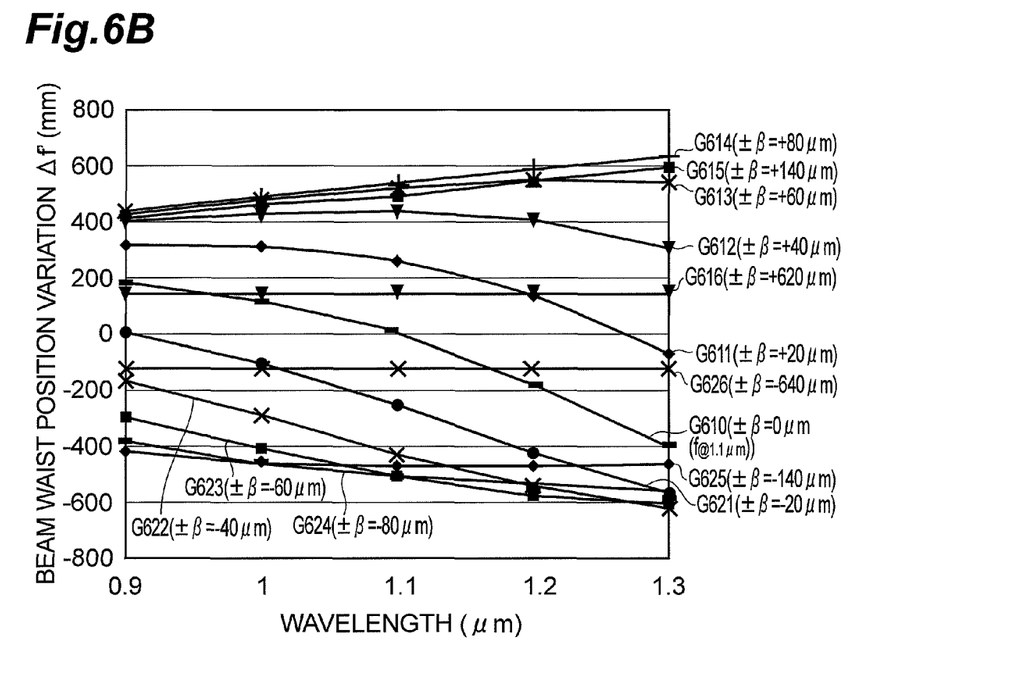

Next, while FIG. 4 shows only the case where the distance between the exit end face 22 of optical fiber 20 and the collimating lens 30 is set at $f_{1.1\,\mu m}$ (focal length of the collimating lens 30 for light with the reference wavelength of 1.1 μm), we investigated how the beam waist position behaved with variation of this distance in a small range. FIGS. 6A and 6B show the result of this calculation. FIG. 6A shows a configuration wherein, with respect to FIG. 5A, the setup position $L_1$ of the collimating lens 30 is the position represented by $f_{1.1 \mu m}$ (reference position) and is changed by $\pm\beta$ (adjustment position) from the reference position. Here, plus values of the adjustment position $\pm\beta$ indicates a region on the condensing lens 40 side with respect to the reference position $L_1$, and minus values of the adjustment position $\pm\beta$ indicates a region on the exit end face 22 side of the optical fiber 20 with respect to the reference position $L_1$. FIG. 6B shows graphs of respective cases where the setup position of the collimating lens 30 is set with $\pm\beta=0$ μm at $f_{1.1 \mu m}$ (or where the collimating lens 30 is set at the reference position) and where the position of the collimating lens 30 is positively or negatively varied at intervals of 20 μm from the reference position. FIG. 6B additionally shows cases of $\pm\beta=-640$ and $+620$ μm for reference. The position variation $\Delta f'$ of beam waist herein refers to "$f_n'(\pm\beta)-f_{1.1 \mu m}'(\pm\beta)$," where $f_n'(\pm\beta)$ represents the focal position of the collimating lens 30 at the wavelength λn in a setup in which the setup position of the collimating lens is "$f_{1.1 \mu m}\pm\beta$."

Specifically, in FIG. 6B, graph G610 shows the relationship for the case of the setup position of the collimating lens 30 with $\pm\beta=0$ μm at $f_{1.1 \mu m}$, graph G611 that for the case of the setup position of the collimating lens 30 with $\pm\beta=+20$ μm, graph G612 that for the case of the setup position of the collimating lens 30 with $\pm\beta=+40$ μm, graph G613 that for the case of the setup position of the collimating lens 30 with $\pm\beta=+60$ μm, graph G614 that for the case of the setup position of the collimating lens 30 with $\pm\beta=+80$ μm, graph G615 that for the case of the setup position of the collimating lens 30 with $\pm\beta=+140$ μm, graph G616 that for the case of the setup position of the collimating lens 30 with $\pm\beta=+620$ μm, graph G621 that for the case of the setup position of the collimating lens 30 with $\pm\beta=-20$ μm, graph G622 that for the case of the setup position of the collimating lens 30 with $\pm\beta=-40$ μm, graph G623 that for the case of the setup position of the collimating lens 30 with $\pm\beta=-60$ μm, graph G624 that for the case of the setup position of the collimating lens 30 with $\pm\beta=-80$ μm, graph G625 that for the case of the setup position of the collimating lens 30 with $\pm=-140$ μm, and graph G626 that for the case of the setup position of the collimating lens 30 with $\pm\beta=-640$ μm.

It is seen from FIG. 6B that the beam waist position variation $\Delta f'$ varies significantly even with variation in $\pm\beta$ at only the intervals of 20 μm.

From the calculation result obtained from FIG. 6B, we calculated maximum variation range $\Delta f$ ($=\Delta f'_{max}$(maximum position)$-\Delta f'_{min}$ (minimum position)) of the beam waist position with change in wavelengths of light in the range of 0.9 μm to 1.3 μm, against adjustment position $\pm\beta$ of the collimating lens 30. The result of this calculation is shown in FIG. 7. At the adjustment position $\pm\beta$ of 0 μm, $\Delta f$ has a maximum value (main peak P1 being a local maximum point of a maximum value) and in the negative direction, $\Delta f$ decreases to approach an asymptote of $\Delta f=0$. On the other hand, the following change was seen in the positive direction: $\Delta f$ once has a minimum (local minimum point P0) at +50 μm; it again has a peak (sub-peak P2 being a local maximum point of a second largest value though being smaller than the main peak P1) near +100 μm; then $\Delta f$ decreases toward 0 with further movement of the position of the collimating lens in the positive direction. We expected that $\Delta f$ must have the maximum point, but the existence of the minimum point thereof was beyond expectation.

Figure 8:
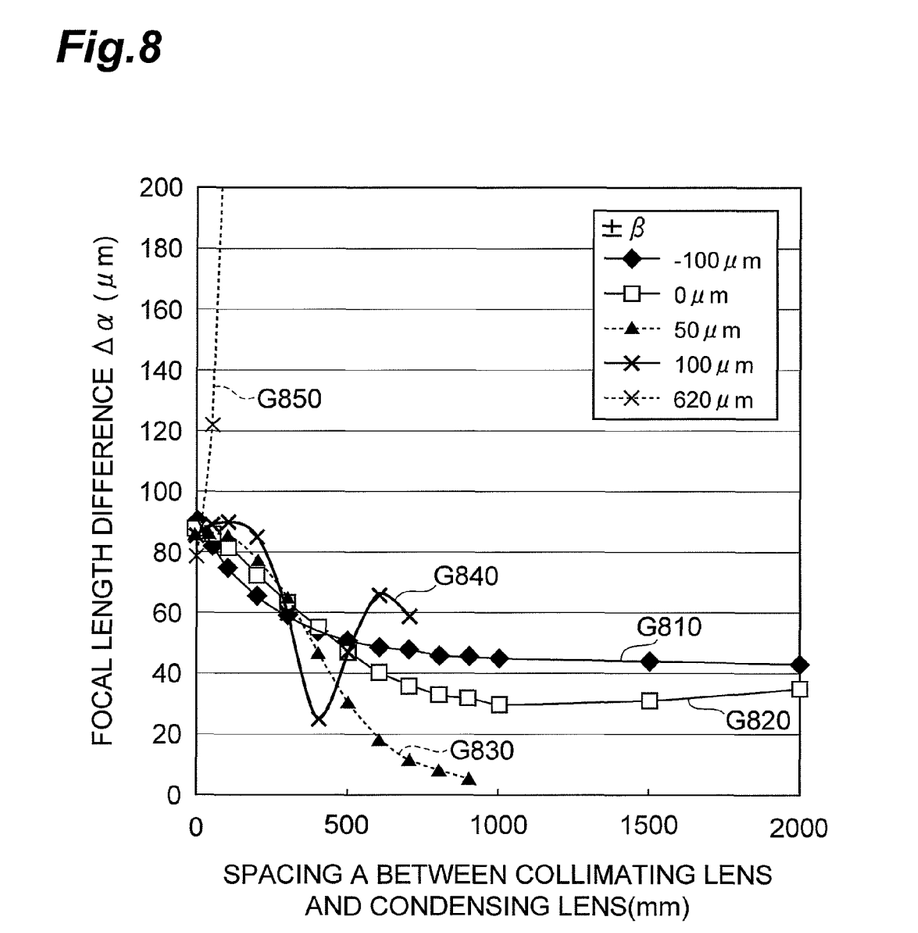
FIG. 8 is a drawing showing the result of calculation of wavelength-dependent focal length difference $\Delta\alpha$ of polychromatic light (wavelengths of 0.9 to 1.3 μm) versus spacing A between the collimating lens and the condensing lens, with variation in adjustment position $\pm\beta$ of the collimating lens.

Since FIG. 7 showed the unexpected behavior of beam waist variation range $\Delta f$, we decided to investigate how the wavelength-dependent focal length difference $\Delta\alpha$, which is the ultimate goal of the present invention, varied with change in the adjustment position $\pm\beta$. FIG. 8 shows the calculation result of variation of wavelength-dependent focal length difference $\Delta\alpha$ against spacing A between the collimating lens 30 and the condensing lens 40, with variation in the adjustment position $\pm\beta$ under the same condition as in FIGS. 6A and 6B. The collimating lens 30 and the condensing lens 40 used were the same as the achromatic lens shown in FIGS. 2A and 2B. In FIG. 8, the calculation was conducted for cases where the adjustment position $\pm\beta$ was $-100$ μm, 0 μm, +50 μm, +100 μm, or +620 μm. Namely, in FIG. 8, graph G810 shows the wavelength-dependent focal length difference $\Delta\alpha$ for the case of the setup position with $\pm\beta=-100$ μm, graph G820 that for the case of the setup position with $\pm\beta=0$ μm, graph G830 that for the case of the setup position with $\pm\beta=+50$ μm, graph G840 that for the case of the setup position with $\pm\beta=+100$ μm, and graph G850 that for the case of the setup position with $\pm\beta=+620$ μm.

With $\pm\beta=+50$ μm, $\Delta\alpha$ was minimum, $\Delta\alpha=6$ μm, when the spacing A was 900 mm. This value was approximately one seventh when compared to $\Delta\alpha$ (43 μm) of the achromatic lens shown in FIGS. 2A and 2B. When the entire apparatus is desired to be constructed in a compact scale, the spacing A needs to be set small; in the region of small A, there is a region of smaller values (e.g., A≥400 mm) in the case of $\pm\beta=+50$ μm to achieve minimum $\Delta\alpha$ than in the case of $\pm\beta=0$ μm. There is also a region of smaller values even in the case of $\pm\beta=+100$ μm, depending upon selection of the region of A, (e.g., A=300 to 500 mm) than in the case of $\pm\beta=+50$ μm, confirming availability thereof. This result was surprising, which could not be expected from FIG. 7.

FIGS. 7 and 8 above were not checked with other achromatic lenses, but we consider that the relation as shown in FIG. 8 must be obtained when a minimum of $\Delta f$ is observed in investigation of variation of $\Delta f$, with variation in relation between the position of outgoing light from the optical fiber 20 and the setup position of the collimating lens 30.

Second Embodiment

Figure 9:
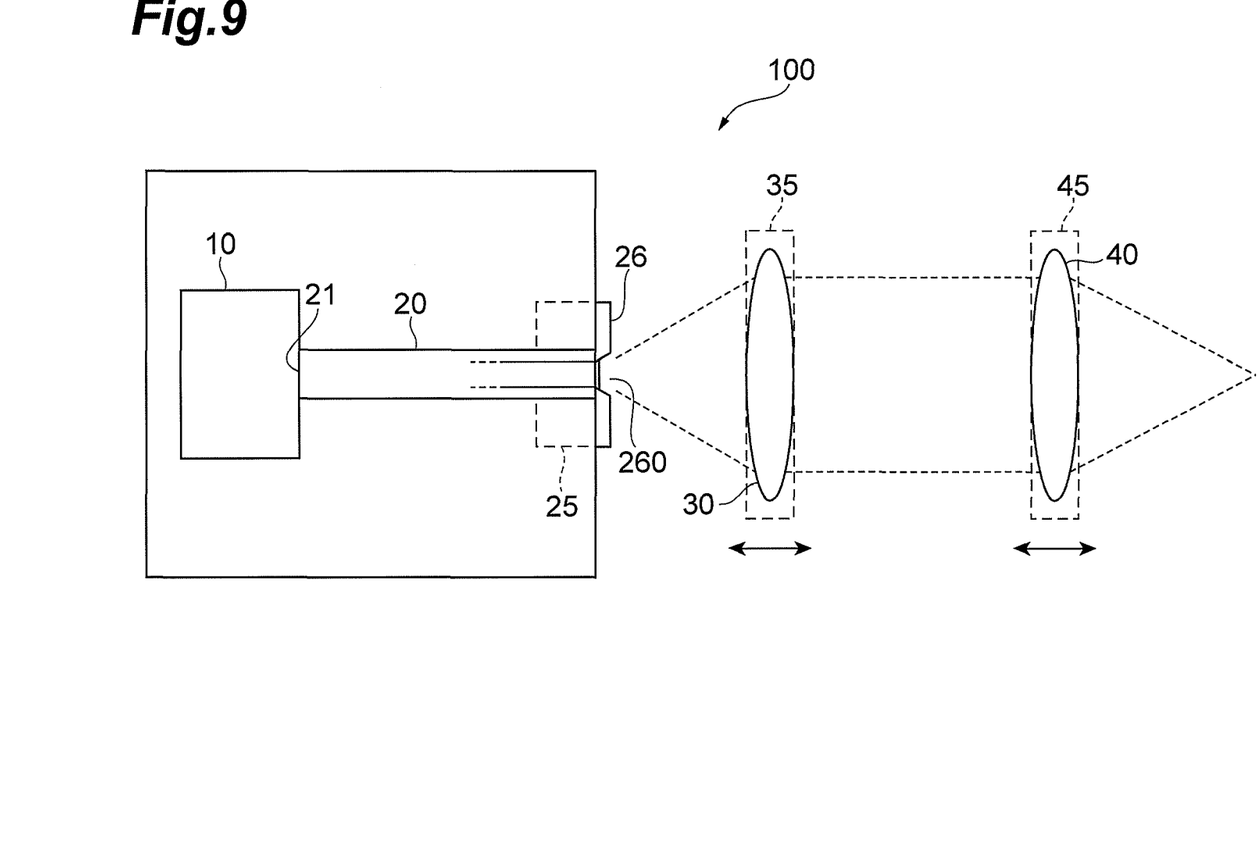
FIG. 9 is a schematic configuration diagram of a laser light source 100 according to the second embodiment.
Figure 10:
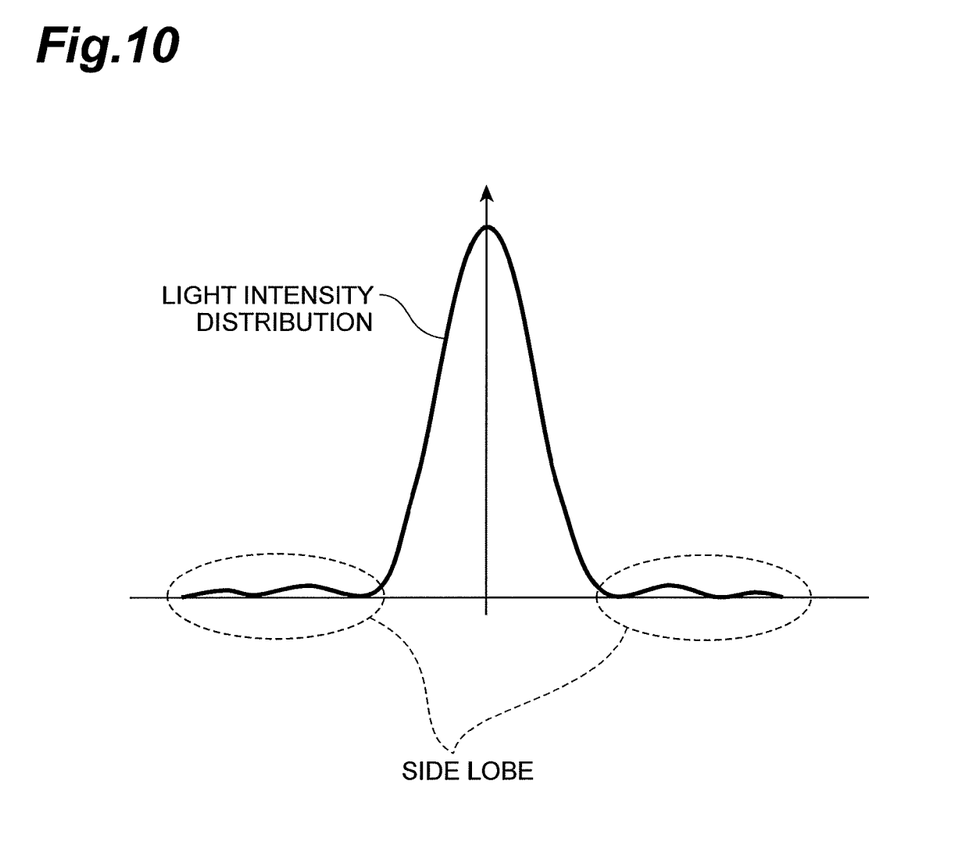
FIG. 10 is a drawing showing optical power of the longest wavelength component having passed through a pinhole with an aperture diameter designed so as to be approximately equal to a mode field diameter of optical fiber 20 for the shortest wavelength component out of wavelength components in a laser beam emitted from a polychromatic light source 10.

FIG. 9 is a schematic configuration diagram of a laser light source 100 according to the second embodiment. This laser light source 100 according to the second embodiment includes the configuration of the laser light source 1 according to the first embodiment shown in FIG. 1B, and is further provided with a pinhole mask 26 installed at the exit position of the laser beam or at the exit end face 22 of the optical fiber 20 in which single-mode light propagates. A pinhole 260 is formed in the pinhole mask 26 and the size (aperture diameter) of the pinhole 260 is approximately equal to or 10% smaller than the mode field diameter of the optical fiber 20 for the shortest wavelength component out of wavelength components of the polychromatic light emitted from the polychromatic light source 10. The pinhole mask 26 is preferably one having the thickness as small as possible, about 100 μm or less. When the pinhole mask 26 is thicker than it, the sectional shape of the pinhole 260 is preferably such a taper shape as not to block the shortest-wavelength light component propagating in the pinhole 260 and diverging because of diffraction. The pinhole is set up so that the respective beam diameters at the exit end face 22 of the optical fiber 20, of all the wavelength components having passed through the pinhole 260 are approximately equal. Particularly, when the polychromatic light emitted from the polychromatic light source 10 has a wide wavelength band (or a large spectrum width), the mode field diameters for wavelength components on the long wavelength side become larger than that for the shortest wavelength component. For this reason, when the light passes through the pinhole 260 having the maximum diameter nearly equal to the mode field diameter for the shortest wavelength component, optical energy is cut, so as to produce an Airy disk (and a side lobe) (cf. FIG. 10). When the optical power of the side lobe region is 10% of the entire optical power, an aperture to cut the side lobe will be installed in the far field image (image formed between the collimating lens setup unit 35 and the condensing lens setup unit 45) in some cases as occasion may demand. The present invention is the invention under the condition that the mode field diameters for the respective wavelengths are equal, and it is considered without the pinhole that there are mode field diameters depending upon wavelengths and there appear focal length differences $\Delta\alpha$ reflecting the mode field diameters.

The embodiments of the present invention provide the collimator device capable of achieving the further reduction in the wavelength-by-wavelength differences of positions (beam waists) where plane waves are formed in collimating polychromatic light with a wide spectrum width, and the laser light source capable of reducing the wavelength-by-wavelength differences of focal positions in collimating and thereafter focusing incoming light with a wide spectrum width.

What is claimed is:

1. A collimator device comprising:
    a laser entrance unit which sets a position of entrance of a laser beam;
    a collimating lens which collimates the laser beam incoming from the laser entrance unit and which is composed of an achromatic lens;
    a collimating lens setup unit which sets up the collimating lens; and
    a position adjustment unit which enables position adjustment of a distance in an optical axis direction of the laser beam between the position of entrance of the laser beam and a setting position of the collimating lens at a 10 μm level or less.

2. A laser light source comprising:
    a light source having an optical fiber at an exit end thereof, the optical fiber emitting a laser beam with a spectrum width of several hundred nm as a single-mode beam;
    a collimating lens which collimates the laser beam emitted to diverge from the optical fiber and which is composed of an achromatic lens;
    a condensing lens which focuses the laser beam collimated by the collimating lens and which is composed of an achromatic lens;
    a laser entrance unit which sets the exit end of the light source as a position of entrance of the laser beam emitted from the optical fiber; and
    a collimating lens setup unit which fixes the collimating lens,
    wherein in a relation of an adjustment position defined by a deviation amount relative to a focal length of the collimating lens at a reference wavelength component in the laser beam, of a distance in an optical axis direction of the laser beam between the position of entrance of the laser beam and a setting position of the collimating lens, versus a variation range defined by a difference between a maximum and a minimum of variations relative to a beam waist position of the reference wavelength component formed through the collimating lens, of beam waist positions differing depending upon wavelength components of the laser beam,
    the distance in an optical axis direction of the laser beam between the position of entrance of the laser beam and the setting position of the collimating lens is adjusted so that the adjustment position falls between a position where the variation range becomes minimum and a position where the variation range becomes sub-peak.

3. The laser light source according to claim 2, comprising a condensing lens setup unit which fixes the condensing lens,
    wherein a spacing between a setting position of the condensing lens and the setting position of the collimating lens is so set that as to focal lengths of the condensing lens differing depending upon the wavelength components in the laser beam, a maximum difference of the focal lengths becomes substantially minimum.

4. The laser light source according to claim 2, comprising a position adjustment unit which is provided for either one of the laser entrance unit and the collimating lens setup unit and which enables position adjustment of the distance between the position of entrance of the laser beam and the setting position of the collimating lens at a 10 μm level or less.

5. The laser light source according to claim 2, comprising a pinhole provided at the exit end of the light source.

6. The laser light source according to claim 5, wherein an aperture diameter of the pinhole is equal to or smaller than a mode field diameter of the optical fiber for a shortest wavelength component out of the wavelength components in the laser beam.

7. The laser light source according to claim 2, wherein an opening end to define the pinhole is processed in a taper shape.

* * * * *